US008150611B2

(12) United States Patent
Mukherjee

(10) Patent No.: US 8,150,611 B2
(45) Date of Patent: Apr. 3, 2012

(54) SYSTEM AND METHODS FOR PROVIDING PREDICTIVE TRAFFIC INFORMATION

(75) Inventor: Maharaj Mukherjee, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 592 days.

(21) Appl. No.: 12/241,156

(22) Filed: Sep. 30, 2008

(65) Prior Publication Data

US 2010/0082226 A1 Apr. 1, 2010

(51) Int. Cl.
*G06F 17/10* (2006.01)
*G01C 21/00* (2006.01)

(52) U.S. Cl. ........ 701/118; 701/117; 701/200; 701/208; 701/209; 701/213

(58) Field of Classification Search .................. 701/118, 701/117, 200, 213, 209, 208
See application file for complete search history.

(56) References Cited

U.S. PATENT DOCUMENTS 7,221,315 B1 5/2007 Chen et al.
7,246,007 B2 7/2007 Ferman
7,260,472 B2 * 8/2007 Sutardja ........................ 701/117
7,269,505 B2 9/2007 Zhao et al.
7,292,937 B2 11/2007 Kuroda et al.
7,319,931 B2 1/2008 Uyeki et al.
2001/0029425 A1 * 10/2001 Myr ............................. 701/200
2003/0040944 A1 2/2003 Hileman
2005/0065711 A1 3/2005 Dahlgren et al.
2006/0031007 A1 2/2006 Agnew et al.
2006/0089787 A1 4/2006 Burr et al.
2006/0111833 A1 * 5/2006 Feldman et al. .............. 701/117
2007/0135990 A1 6/2007 Seymour et al.
2008/0071466 A1 * 3/2008 Downs et al. ................ 701/117
2008/0094250 A1 4/2008 Myr
2008/0109153 A1 * 5/2008 Gueziec ........................ 701/117
2008/0195428 A1 * 8/2008 O'Sullivan ........................ 705/6

* cited by examiner

*Primary Examiner* — Khoi Tran
*Assistant Examiner* — Ian Jen
(74) *Attorney, Agent, or Firm* — Cahn & Samuels, LLP

(57) ABSTRACT

A method for providing predictive traffic information to global positioning satellite systems on board vehicles includes a plurality of GPS-enabled vehicles, each estimating at least one travel route comprising a plurality of road segments and estimating arrival and exit times for the vehicle in each road segment; calculating an initial road capacity for each road segment; statistically polling a plurality of GPS-enabled vehicles; obtaining at least one of at least one static parameter, at least one dynamic parameter, or at least one catastrophic condition relating to the at least one travel route; and calculating predictive capacity estimates for each road segment for at least one future time interval.

20 Claims, 15 Drawing Sheets

| Time Interval | Segment 101 | Segment 102 | Segment 103 | Segment 104 | Segment 105 | Segment 106 |
|---|---|---|---|---|---|---|
| 00-01 | | | | | | |
| 01-02 | | | | | | X |
| 02-03 | | | | | | X |
| 04-05 | | | | | | X |
| 05-06 | | | | | X | |
| 06-07 | | | | | X | |
| 07-08 | | | | X | | |
| 08-09 | | | | X | | |
| 09-10 | | | | X | | |
| 10-11 | | | X | | | |
| 11-12 | | | X | | | |
| 12-13 | | | X | | | |

FIG. 8

SYSTEM AND METHODS FOR PROVIDING PREDICTIVE TRAFFIC INFORMATION

I. FIELD OF THE INVENTION

This invention relates to a system and methods for providing predictive traffic information to on-board navigation systems, particularly to vehicles equipped with on-board global positioning satellite (GPS) systems.

II. BACKGROUND OF THE INVENTION

Currently, traffic information is available on high-end global positioning satellite systems. However, such traffic information generally only describes the condition of a certain traffic route at the present.

Methodologies exist to measure or predict the traffic flow as a car moves along a particular roadway. However, such methodologies rely on long-term historical data, which is not a good predictor of future traffic flow, or are one dimensional in predicting traffic flow as a function of arrival time at a certain point. There remains a need to accurately predict road capacity at future intervals as a function of not only time, but other parameters as well.

III. SUMMARY OF THE INVENTION

According to the present invention, a method for providing predictive traffic information to global positioning satellite systems on board vehicles is provided. For a plurality of GPS-enabled vehicles, each vehicle estimates at least one travel route comprising a plurality of road segments and estimates arrival and exit times for the vehicle in each road segment. An initial road capacity is calculated for each road segment. A plurality of GPS-enabled vehicles is statistically polled. At least one of at least one static parameter, at least one dynamic parameter, or at least one catastrophic condition relating to the at least one travel route is obtained. Predictive capacity estimates for each road segment for at least one future time interval are calculated and sent to the plurality of GPS-enabled vehicles. The GPS-enabled vehicles re-calculate the at least one travel route and the arrival and exit times for the vehicle in each road segment.

According to another aspect of the invention, a method for providing predictive traffic information to global positioning satellite systems on board vehicles is provided. For a plurality of GPS-enabled vehicles, each vehicle estimates at least one travel route comprising a plurality of road segments and estimates arrival and exit times for each road segment. An initial road capacity for each road segment is calculated based on the estimated arrival and exit times for each road segment and at least one of posted speed limits, traffic signs, or traffic lights. The initial road capacity estimates are updated based on at least one of traffic flow conditions or weather conditions. The plurality of GPS-enabled vehicles is statistically polled, each vehicle providing the at least one travel route and estimated arrival and exit times for each road segment. Predictive capacity estimates are calculated for each road segment for at least one future interval. The predictive capacity estimates for at least one future time interval are sent to a plurality of GPS-enabled vehicles. The GPS-enabled vehicles re-calculate the at least one travel route and the arrival and exit times for each road segment.

According to another aspect of the invention, a system for providing predictive traffic information to global positioning satellite systems on board vehicles is provided. The system comprises an agent for calculating predictive capacity estimates for future intervals for each road segment of at least one travel route; and at least one client comprising a Polling Tool for statistical polling of a plurality of GPS-enabled vehicles.

According to another aspect of the invention, a computer program product is provided comprising a computer useable medium having a computer readable program. When executed on a computer, the computer readable program causes the computer to estimate at least one travel route comprising a plurality of road segments and estimate arrival and exit times in each road segment for at least one GPS-enabled vehicle; calculate an initial road capacity for each road segment; statistically poll a plurality of GPS-enabled vehicles; obtain at least one of at least one static parameter, at least one dynamic parameter, or at least one catastrophic condition relating to the at least one travel route; calculate predictive capacity estimates for each road segment for at least one future time interval; send the predictive capacity estimates to the plurality of GPS-enabled vehicles; and recalculate the at least one travel route and the arrival and exit times for the vehicle in each road segment.

As used herein “substantially”, “relatively”, “generally”, “about”, and “approximately” are relative modifiers intended to indicate permissible variation from the characteristic so modified. They are not intended to be limited to the absolute value or characteristic which it modifies but rather approaching or approximating such a physical or functional characteristic.

In the detailed description, references to “one embodiment”, “an embodiment”, or “in embodiments” mean that the feature being referred to is included in at least one embodiment of the invention. Moreover, separate references to “one embodiment”, “an embodiment”, or “in embodiments” do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the system and methods should become evident to a person of ordinary skill in the art.

IV. BRIEF DESCRIPTION OF THE DRAWINGS

FIG. 8 is a table showing road segments and time intervals for the proposed route of FIG. 5.

V. DETAILED DESCRIPTION OF THE DRAWINGS

FIGS. 1-15 illustrate a system and methods for providing predictive traffic information to vehicles via an on-board navigation system, for example, a GPS system. According to the present invention, weighted capacity estimates for road segments along at least one travel route at future time intervals are determined by statistically polling a plurality of GPS-enabled vehicles and analyzing (1) estimated arrival and exit times for each road segment; and (2) at least one of at least one static parameter, at least one dynamic parameter, or at least one catastrophic condition. Statistical polling or sampling of a plurality of vehicles having on-board navigation systems along at least one travel route results in a greater degree of reliability as to any predicted road capacity estimates than current methods using historical data.

Figure 1:
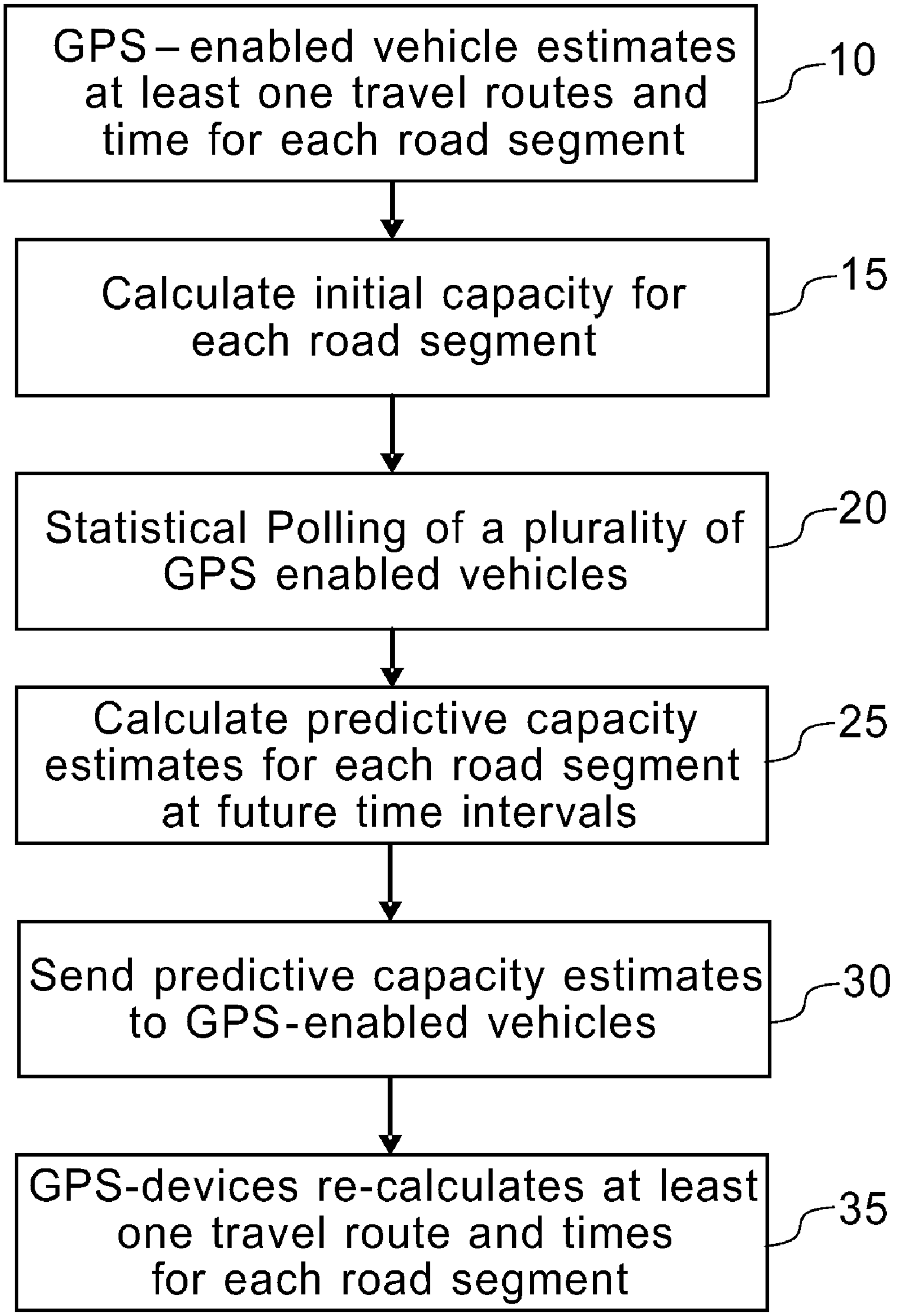
FIG. 1 illustrates a flowchart for a method according to an embodiment of the present invention.

According to the present invention, a plurality of vehicles are enabled or equipped with on-board navigation systems, particularly GPS systems. As shown in FIG. 1, each GPS-enabled vehicle estimates at least one travel route and estimates the time that the vehicle will arrive at and exit each road segment along the at least one travel route 10. The initial road capacity is calculated for each road segment 15. A statistical polling or sampling of the plurality of GPS-enabled vehicles or any subset thereof is taken 20. Predictive capacity estimates are calculated for each road segment at future time intervals 25 and are sent back to the GPS-enabled vehicles 30. Using the predictive capacity estimates, the on-board GPS devices re-calculate the at least one travel route, as well as the time the vehicle will arrive at and exit each road segment 35. The present invention will be described in further detail below.

Figure 2:
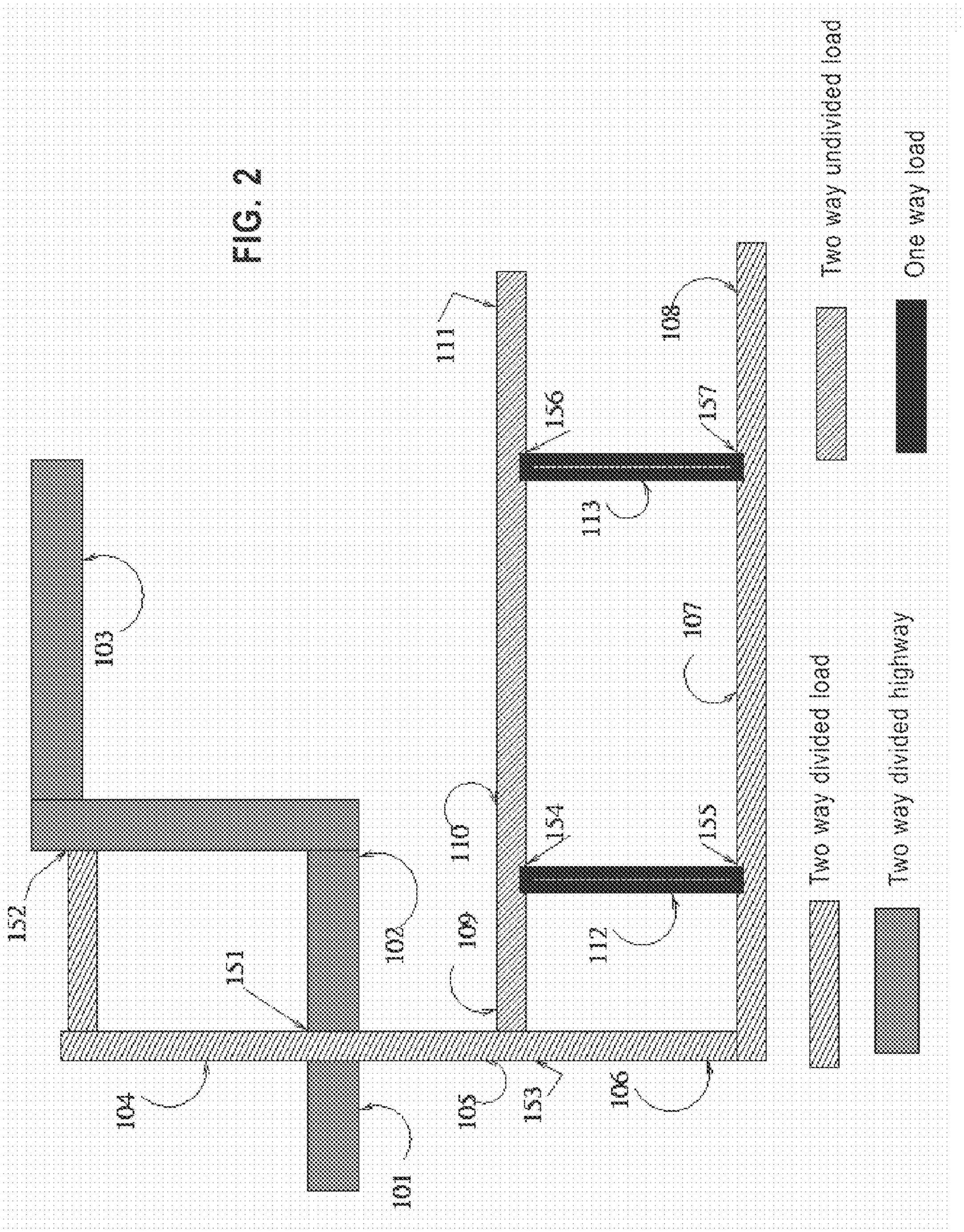
FIG. 2 illustrates an exemplary road map with road segments and intersections.
Figure 3:
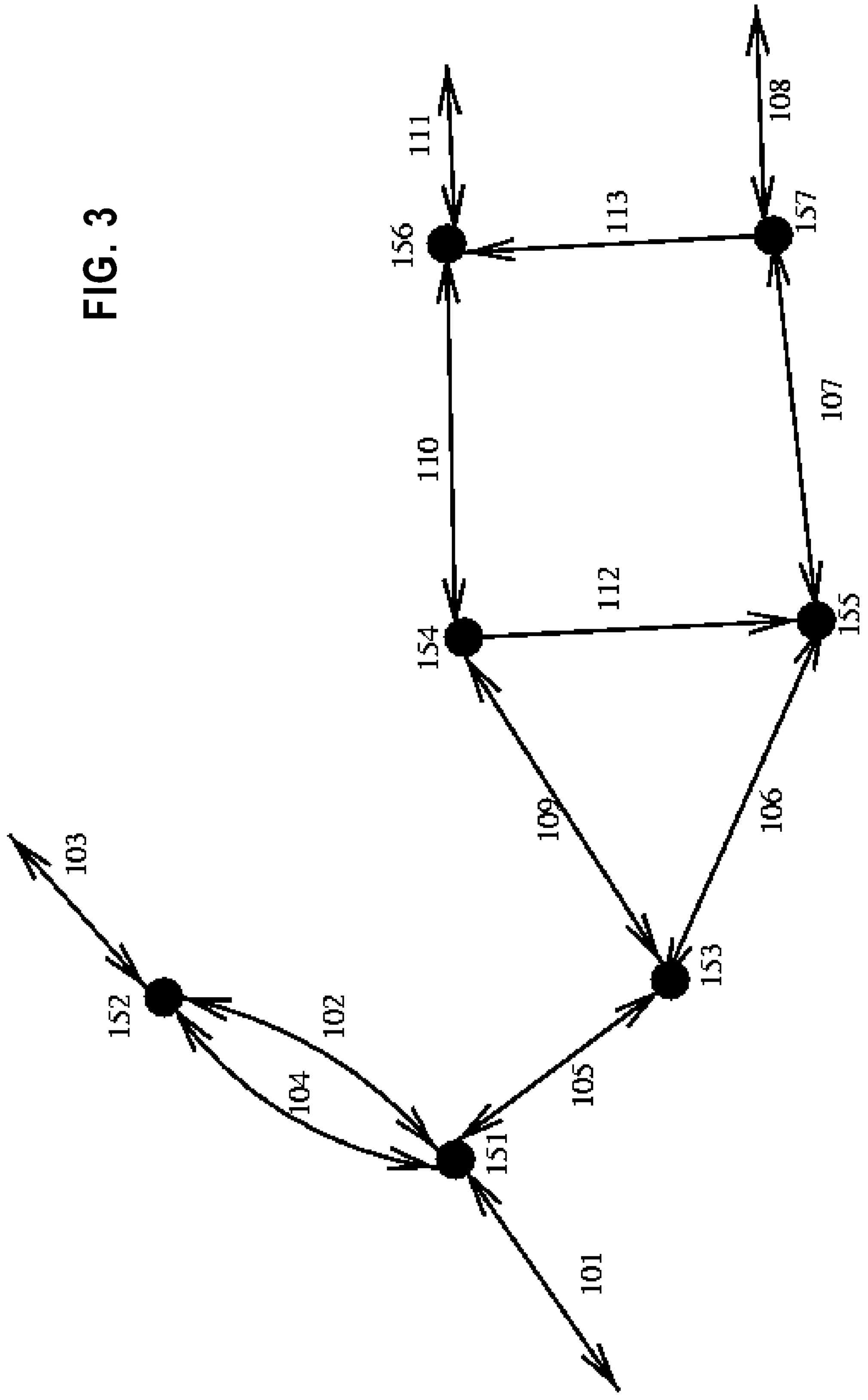
FIG. 3 illustrates a directional graph of the road map of FIG. 2.

According to the present invention, the at least one travel route may include at least one of a street, road, one-way road, two-way road, highway, freeway, interstate, toll road, high-occupancy vehicle (HOV) lane, high-occupancy toll (HOT) lane, or the like. The at least one travel route is subdivided into a plurality of road segments. In embodiments, the at least one travel route may be segmented into a plurality of segments based on the length between at least one of intersections, traffic lights, traffic signs, or landmarks. For example, FIG. 2 is an illustrative road map in which roads are divided into segments between intersections, shown illustratively as numbered segments (101 through 113) and intersections (151 through 157). FIG. 3 is a directional graph of the road map of FIG. 2 showing one-way and two-way traffic.

A. Initial and Updated Weighted Capacity Estimates for Road Segments

Figure 4:
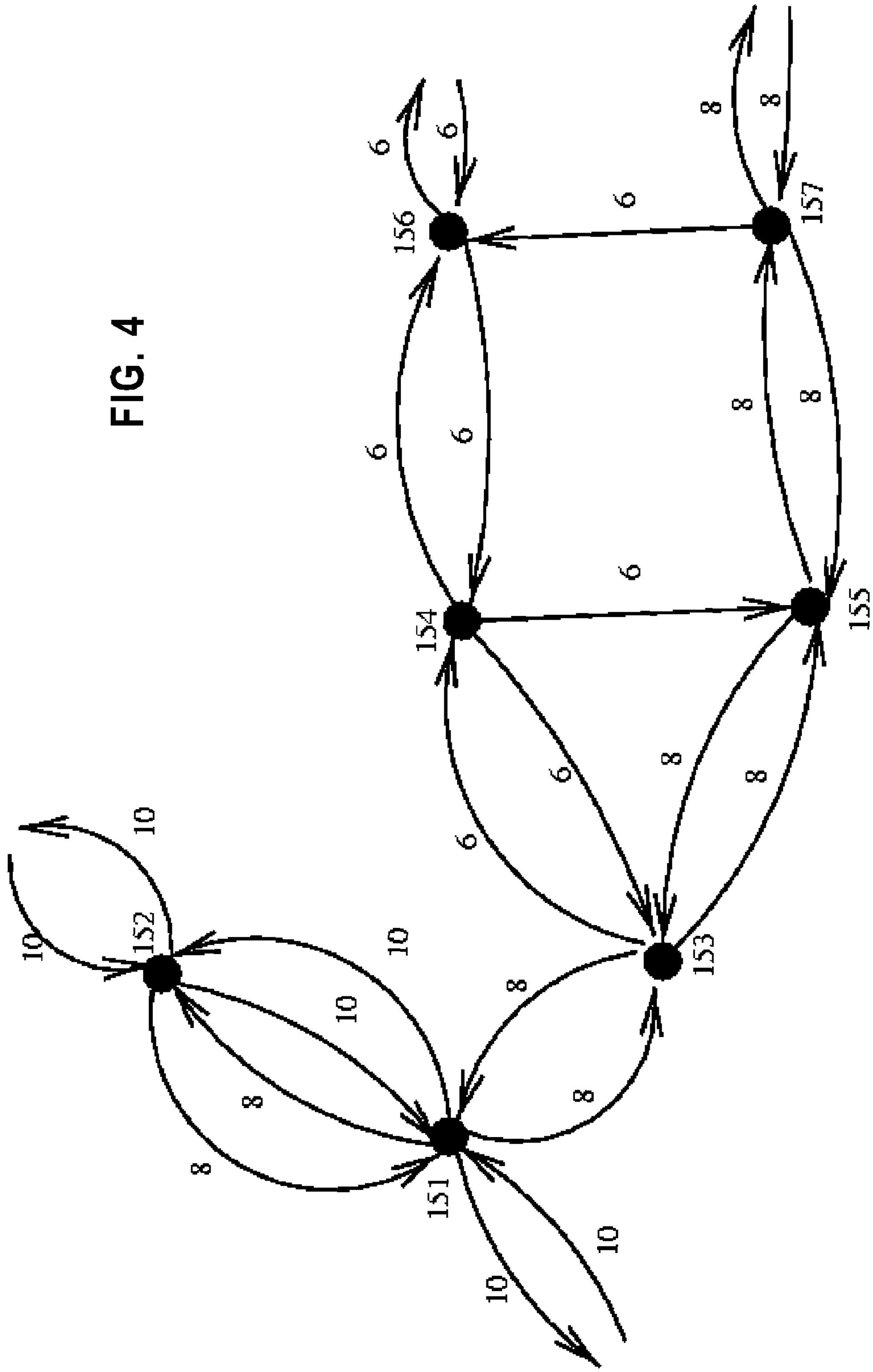
FIG. 4 illustrates the directional graph of FIG. 3 with weighted capacities for each road segment.

An initial weighted capacity is calculated for each road segment of the at least one travel route, as shown in FIG. 4. The initial weighted capacity estimates are calculated using the at least one travel route and estimated arrival and exit times for each road segment from the GPS-enabled vehicles and at least one static parameter. The at least one static parameter may include, but is not limited to, the configuration of the at least one travel route (e.g., number of lanes, one-way, two-way, divided, undivided), posted speed limits, number of turns, number of traffic lights, turns in the route, number of traffic signs, or type of traffic signs (e.g., stop, slow, or yield signs). In embodiments, the initial weighted road capacity estimates are based on the at least one travel route, the estimated times the vehicle will arrive at and exit each segment, and posted speed limits along the at least one travel route. The weighted capacity for the road segments may be represented on any scale, for example, on a scale of 1 to 10 (as shown) or on a scale of 1 to 100. The GPS device for each vehicle may provide the data regarding at least one static parameter or the data may be obtained from another source, for example as discussed below.

According to the present invention, data for at least one dynamic parameter or catastrophic condition may be obtained. Dynamic parameters include, but are not limited to, weather conditions, traffic flow conditions, road conditions, congestion, construction, detours, or the like. Catastrophic conditions may comprise a road closure, accident, flooding, sink hole, fire, snow closure, or the like. In embodiments, the at least one dynamic parameter or catastrophic condition may be obtained from the GPS devices for each vehicle or preferably from another source including, but not limited to, at least one of a website; cable, radio, or satellite weather source; or state, local, or federal agency, for example, police or department of motor vehicle updates.

Figure 5:
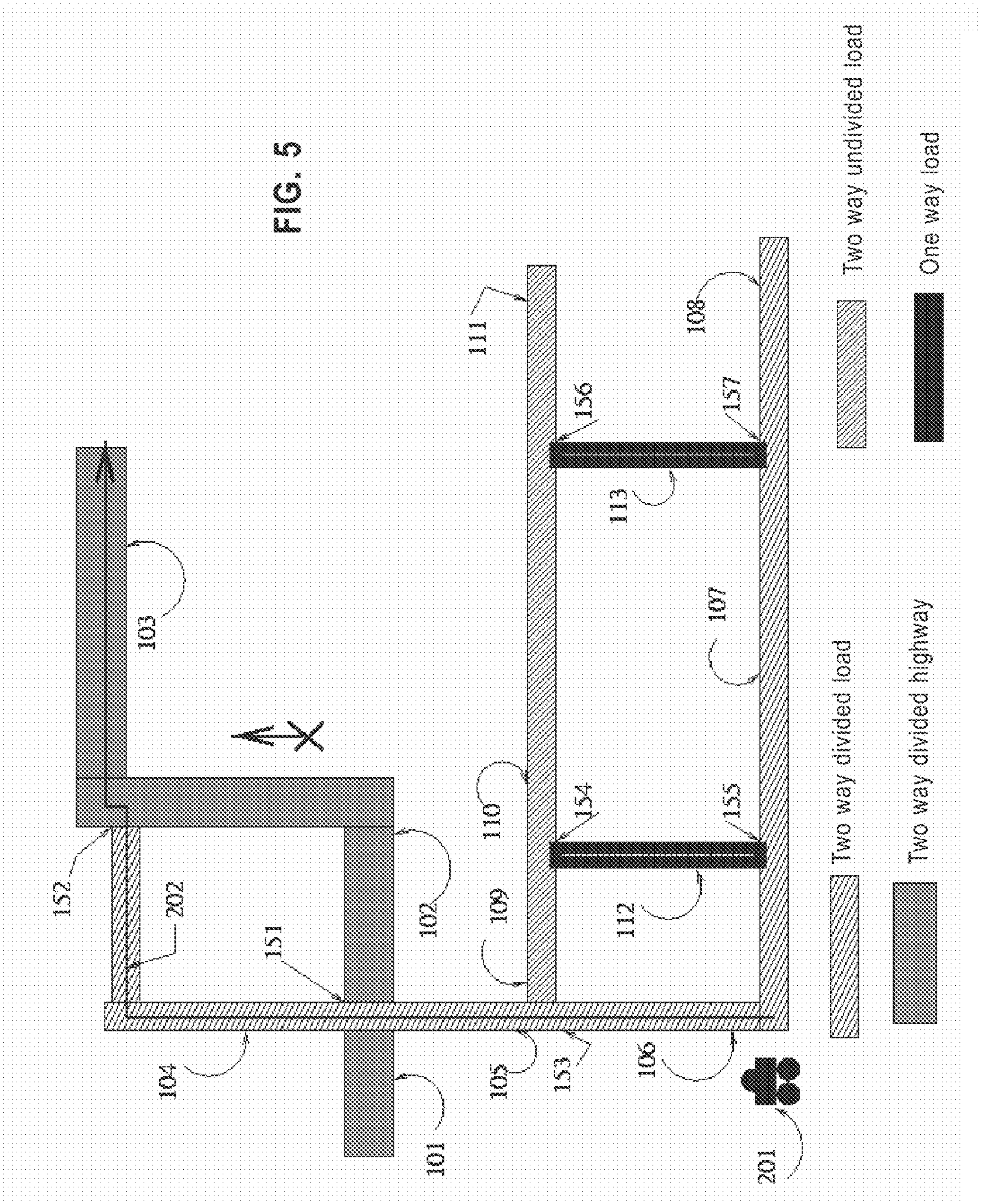
FIG. 5 illustrates the road map of FIG. 2 with a vehicle, its proposed route, and a traffic incident along one road segment.
Figure 6:
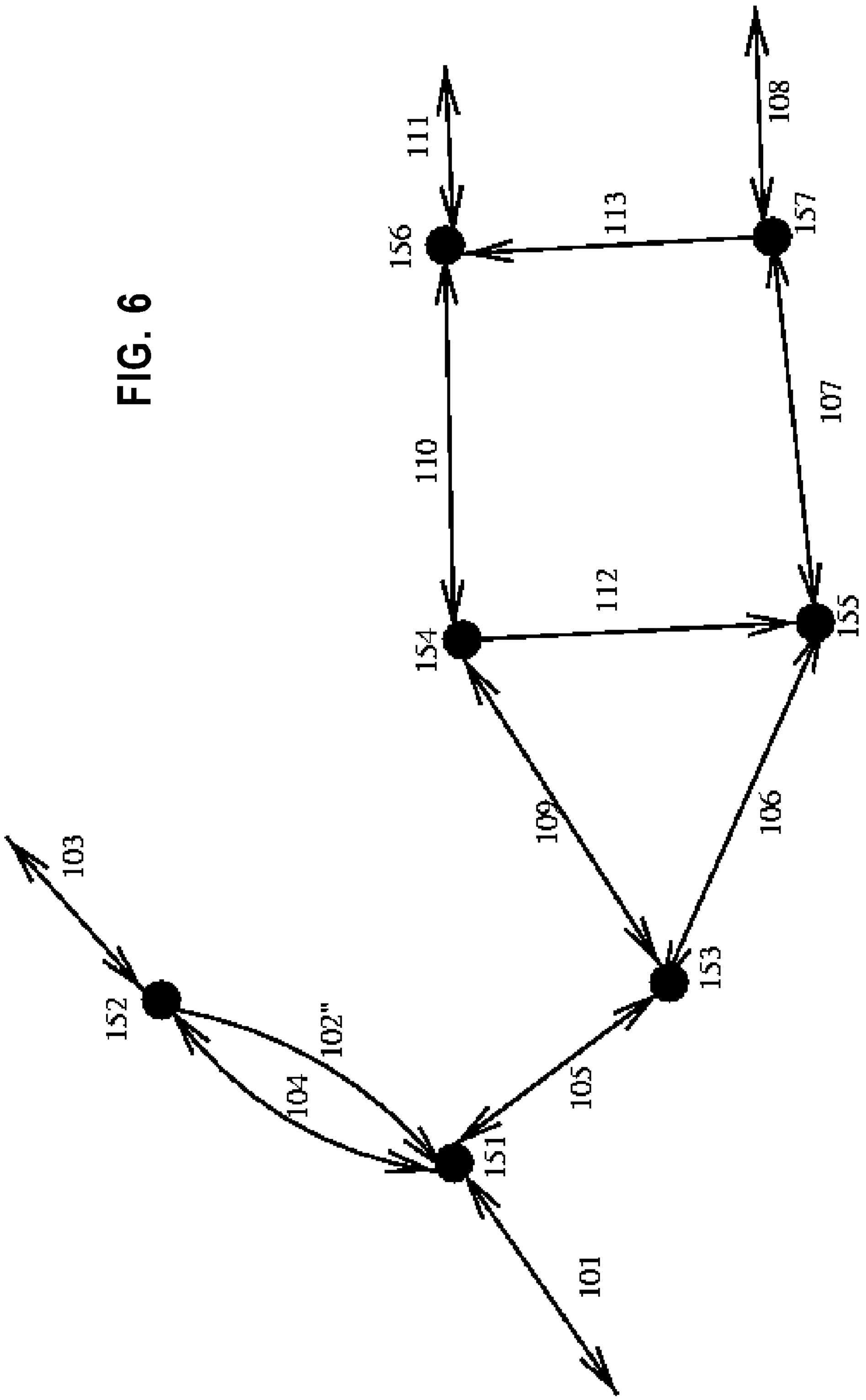
FIG. 6 illustrates a directional graph of the road map of FIG. 5.

As shown in FIG. 5, a dynamic parameter regarding current traffic flow conditions is obtained in the geographic region for vehicle 201 and its at least one travel route 202. Road segment 102 in the northbound direction is blocked due to a traffic incident illustrated by "X". FIG. 6 is a directional graph of the road map of FIG. 5 in which the direction of road segment 102 is only in a southbound direction due to the traffic incident, as shown by 102".

Figure 7:
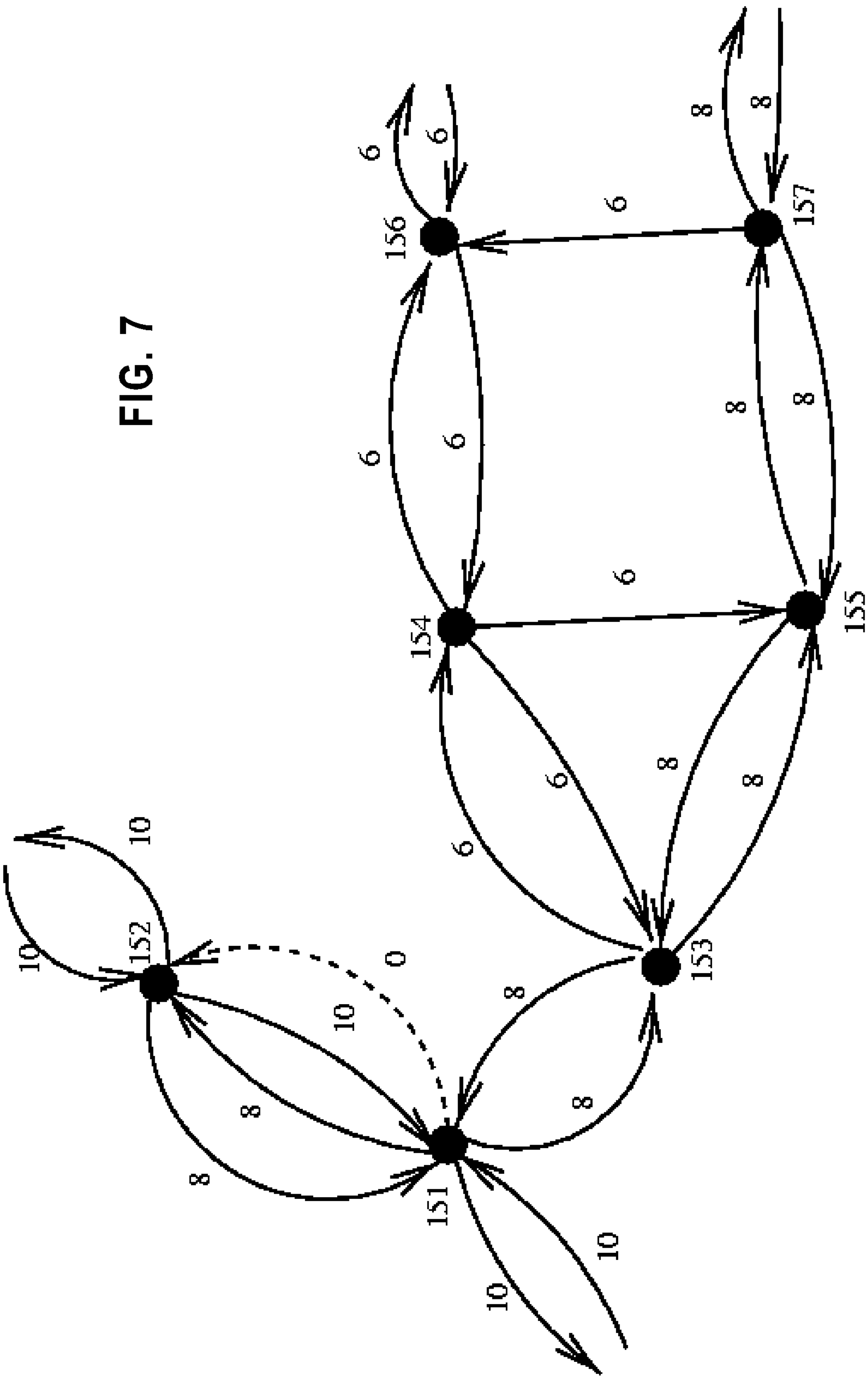
FIG. 7 illustrates the directional graph of FIG. 5 with weighted capacities for each road segment.

According to the present invention, the initial weighted capacity values for the road segments are updated based on the at least one of at least one dynamic parameter or at least one catastrophic condition. FIG. 7 is a directional graph of the road map of FIG. 5 with updated weighted capacities for each road segment. Due to the traffic incident on the northbound section of segment 102, the weighted capacity is zero as shown by a dashed arrow.

B. Statistical Polling of a Plurality of GPS-Enabled Vehicles

Polling or sampling is that part of statistical practice concerned with the selection of individual observations intended to yield some knowledge about a population of concern, especially for the purposes of statistical inference. Each observation measures at least one property (e.g., location at a particular road segment, expected time of arrival, expected time of exit) of an observable entity enumerated to distinguish objects or individuals. Survey weights often may be applied to the data to adjust for the sample design. Results from probability theory and statistical theory are employed to guide practice.

According to the present invention, a statistical polling of a plurality of GPS-enabled vehicles or any subset thereof is taken. The statistical polling comprises data including the number of vehicles on at least one travel route in a given geographic region and the time estimates for when each vehicle will arrive and exit each road segment of the at least one travel route. In embodiments, a driver may have the option of whether or not to respond to the statistical polling of the GPS device. A driver may also have the option of ensuring that any statistical pooling of his or her vehicle is anonymous, thereby protecting the privacy of the driver.

The polled data may be in any form, for example, in the form of a table, graph, spreadsheet, or chart. For example, FIG. 8 illustrates a table for vehicle 201 and proposed travel route 202 of FIG. 5. For time intervals 01-13, the chart estimates when vehicle 201 will be in each road segment 103-106. Of course, it is possible that for a given time interval a vehicle will arrive at and/or exit more that one road segment.

According to the present invention, the statistically polled population of vehicles may comprise a representation of all types of vehicles in a particular geographic location. Thus, in embodiments, statistical polling may comprise data from different types of GPS-enabled vehicles (e.g., 2-door sedan, 4-door sedan, SUV, motorcycles, trucks, buses, or the like). The data may also comprise the year of manufacture for the polled vehicles.

The sampling frame concerns the hour of the day and time and sampling interval. The sampling interval may be chosen to account for the changes in the traffic and road computation. In embodiments, the sampling rate may be one in every hundred vehicles, with the total number of samples not less than 100. The reliability of the predictive road capacities decreases if the sample size is less than 100.

The sample size of a statistical sample is the number of observations that constitute it. It is typically denoted n, a positive integer. Typically, all else being equal, a larger sample size leads to increased precision in estimates of various properties of the population. For example, a typical statistical aim may be to demonstrate with 95% certainty (95% confidence interval) that the true value of a parameter is within a distance B of the estimate, in which B is an error range that decreases with increasing sample size (n).

In embodiments of the present invention, to obtain with 95% certainty that the polled sample of vehicles reflects the true types of vehicles and year of manufacture, the sample size may be n=100 with an error around 10%. For a sample size of n=400, the error is about 5%; and for a sample size n=10,000, the error is about 1%.

C. Predictive Capacity for Road Segments at Future Time Intervals

Based on the statistical polling, a capacity estimate for each road segment of the at least one travel route is predicted for at least one future time interval. In embodiments, the predictive capacity estimates may also be based on the updated capacity estimates based on at least one of at least one static parameter, at least one dynamic parameter, or at least one catastrophic condition. The at least one future time interval may be capacity estimates for a road segment, for example, in 5 minutes, in 15 minutes, in 30 minutes, or in 60 minutes. If a vehicle is predicted to travel from one road segment to another road segment during the at least one future time interval, the capacity estimates for both road segments will take that into account for that particular interval. The predictive capacity estimates for at least one future time interval are sent to the plurality of GPS-enabled vehicles, which then re-calculate the at least one travel route and the arrival and exit times for each road segment.

Figure 9:
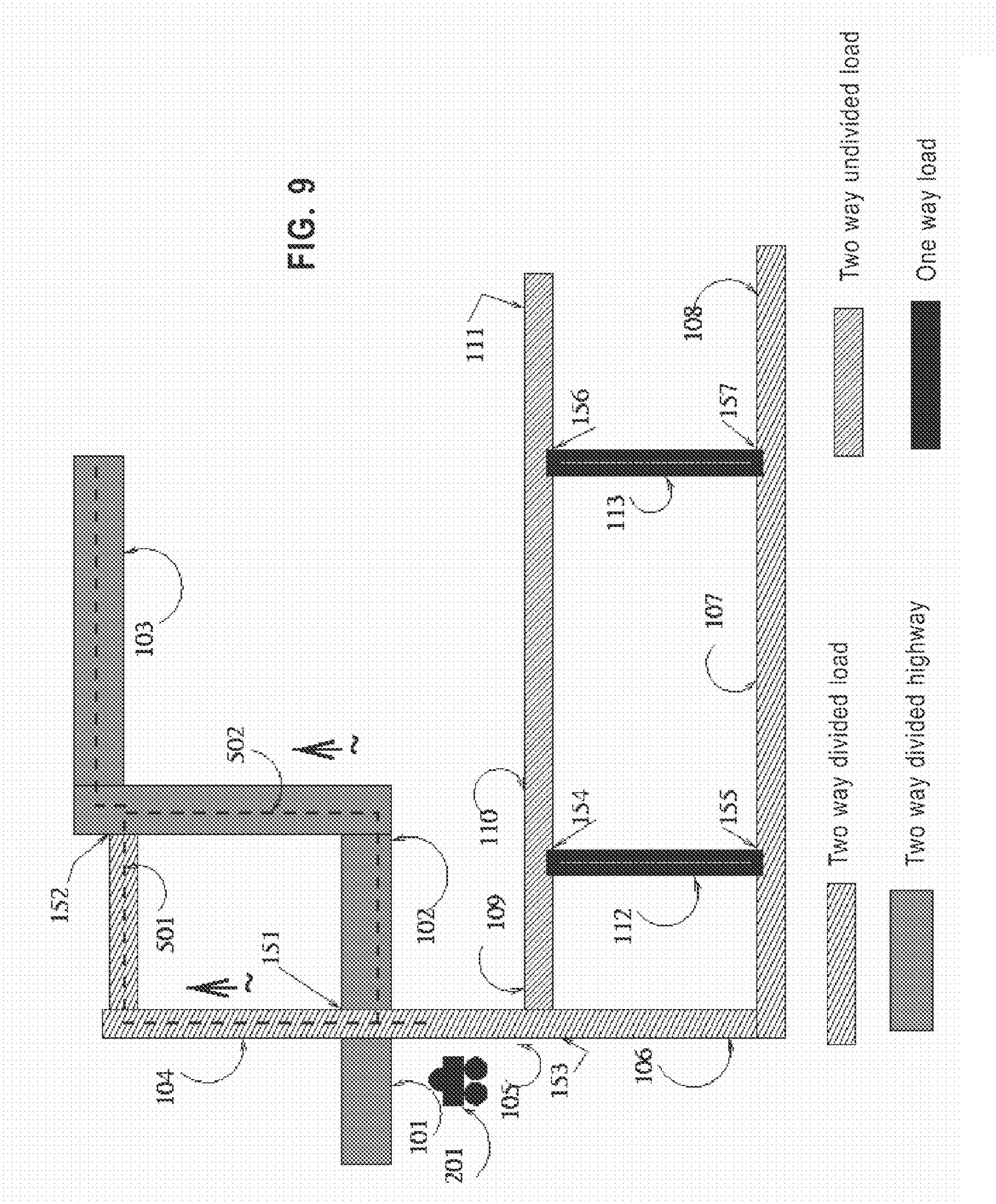
FIG. 9 illustrates a road map for the vehicle of FIG. 5 and updated traffic flow information.

FIG. 9 illustrates that vehicle 201 is statistically polled between intersection 153 and intersection 151 (road segment 105). An updated analysis of at least one dynamic parameter (traffic flow conditions) indicates that the earlier traffic incident along segment 102 has cleared, thereby allowing for possible travel routes 501 or 502.

Figure 10:
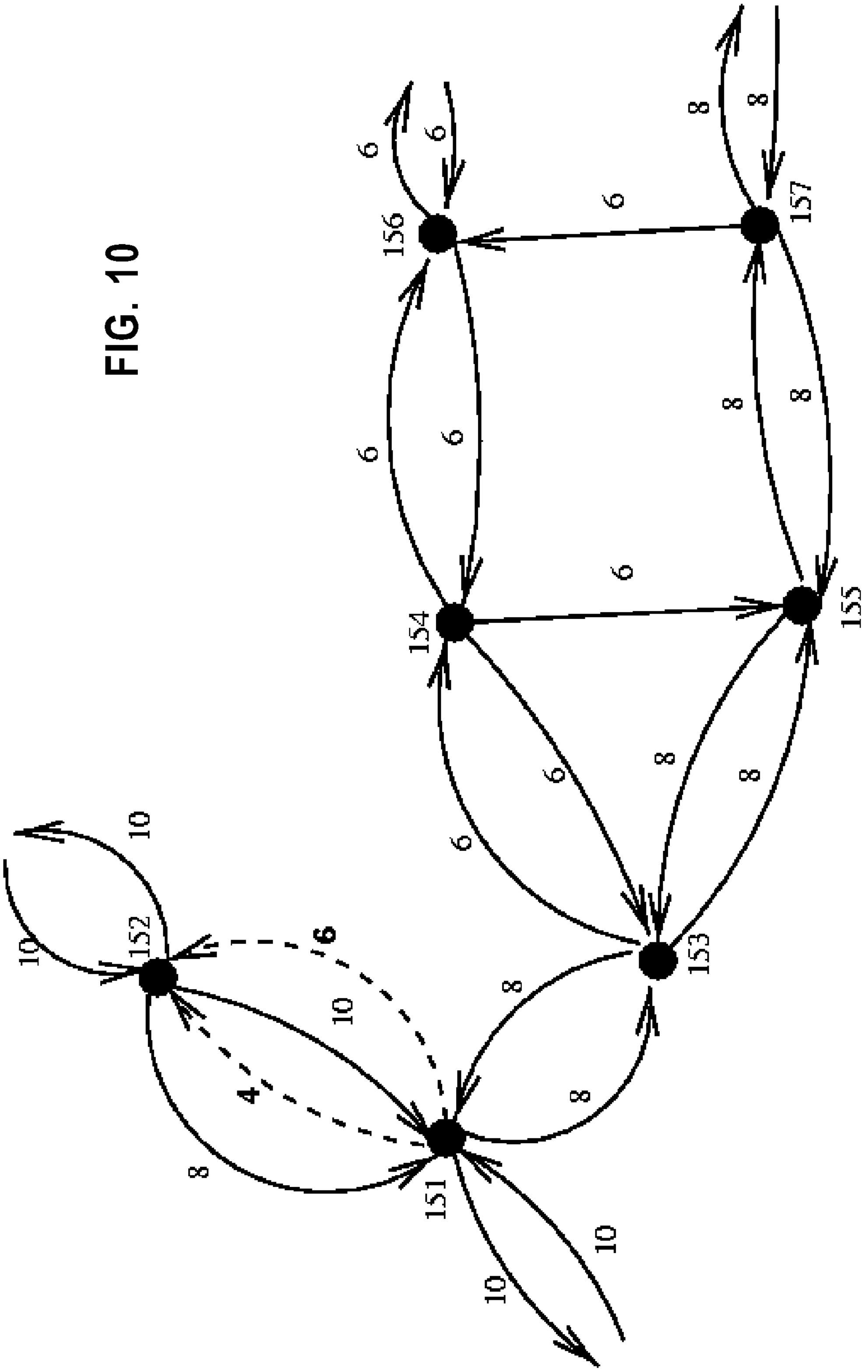
FIG. 10 illustrates the road map of FIG. 9 with predicted future capacities for each road segment.

Weighted capacity estimates for each road segment are predicted for future time intervals, as shown in FIG. 10. It is predicted that the northbound segment 104 is expected to experience a decrease in capacity (from 10 to 4) as more vehicles opted to avoid northbound 102 in response to the traffic incident. However, northbound 102 is predicted to have an increase in capacity (from 0 to 6) as the traffic incident has recently cleared. The predictive capacity estimates for at least one future time interval (e.g., in 15 minutes) for each road segment are sent back to the GPS device of vehicle 201.

Figure 11:
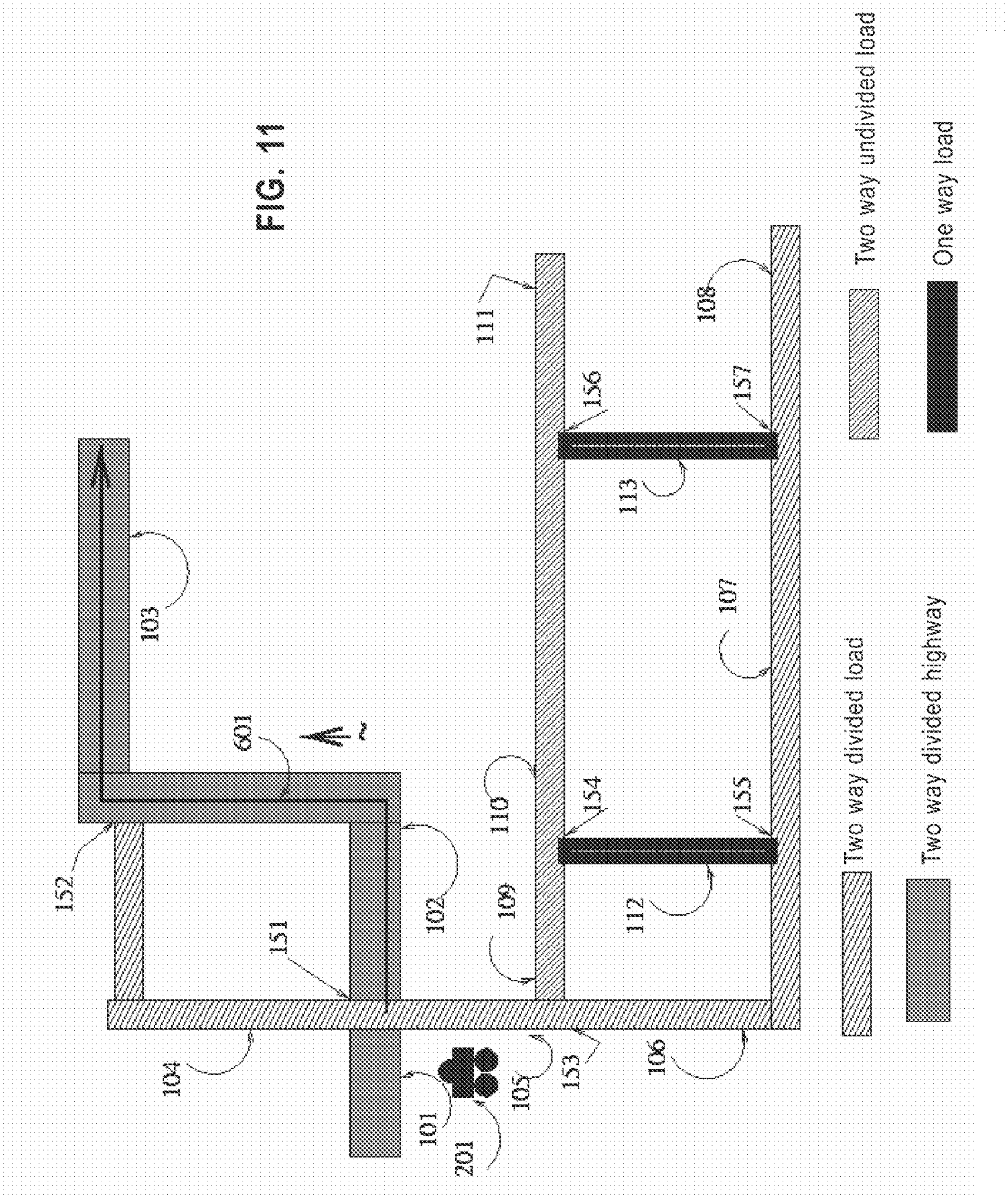
FIG. 11 illustrates the road map of FIG. 10 with the re-calculated travel route for the vehicle after considering the predicted future capacities.

Using the predictive capacity estimates, the on-board GPS device of vehicle 201 re-calculates the at least one travel route as well as the time the vehicle will arrive at each segment. As shown in FIG. 11, the proposed travel route 202 is now changed to travel route 601. In embodiments, Dijkstra's algorithm or a greedy algorithm may be used to calculate the optimal at least one travel route.

D. Exemplary Flowchart for Each GPS-enabled Vehicle

Figure 12:
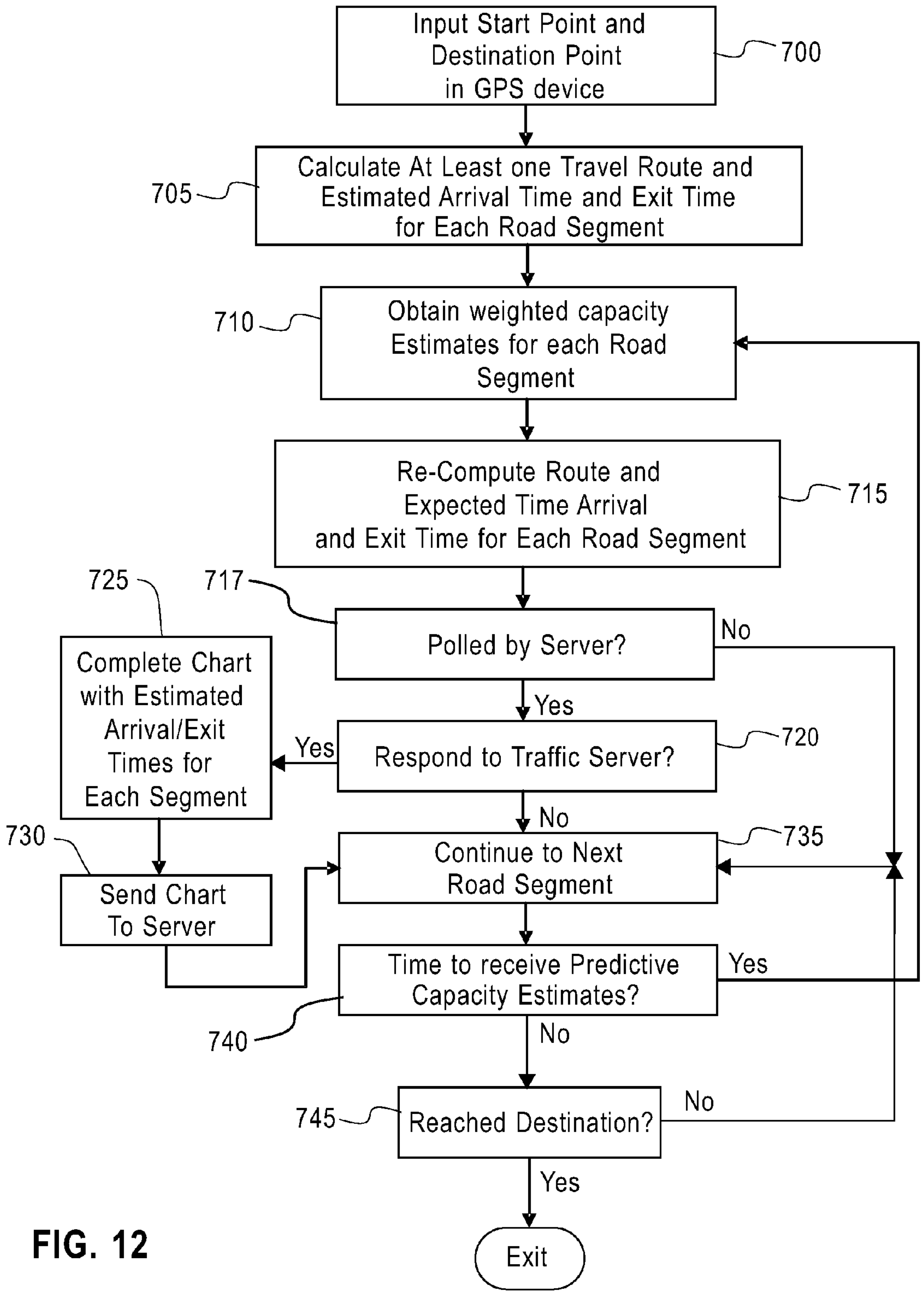
FIG. 12 illustrates an exemplary flowchart for a GPS-enabled vehicle according to an embodiment of the present invention.

FIG. 12 illustrates an exemplary flowchart for a GPS-enabled vehicle according to an embodiment of the invention.

For each GPS-enabled vehicle, the start point and destination point are input into the GPS device 700. At least one travel route and the expected time of arrival and exit for each road segment along the at least one travel route are calculated 705. Weighted capacity estimates for each road segment are obtained 710. The at least one travel route and the expected times of arrival and exit for each road segment are recalculated based on the capacity information 715.

The GPS-enabled vehicle may be polled, for example by a server 717. The driver is given the option of responding to the statistical polling or not 720. If the GPS-enabled vehicle responds to the statistical polling, the GPS-enabled vehicle completes a chart with information about arrival and exit times for each road segment along the at least one travel route 725 and sends the chart to the server 730.

The chart need not contain any identifying or private information regarding the vehicle and/or the driver or any one on board, thereby assuaging any privacy concerns the occupants of the vehicle might have in sending the information.

The vehicle continues along the at least one travel route and proceeds to the next road segment 735. The vehicle may receive predictive capacity information from the traffic server and re-computes the at least one travel route and the expected time of arrival and exit time for each road segment 740. The vehicle continues this process until it reached its destination point 745.

E. Exemplary Flowchart for a Traffic Server

Figure 13:
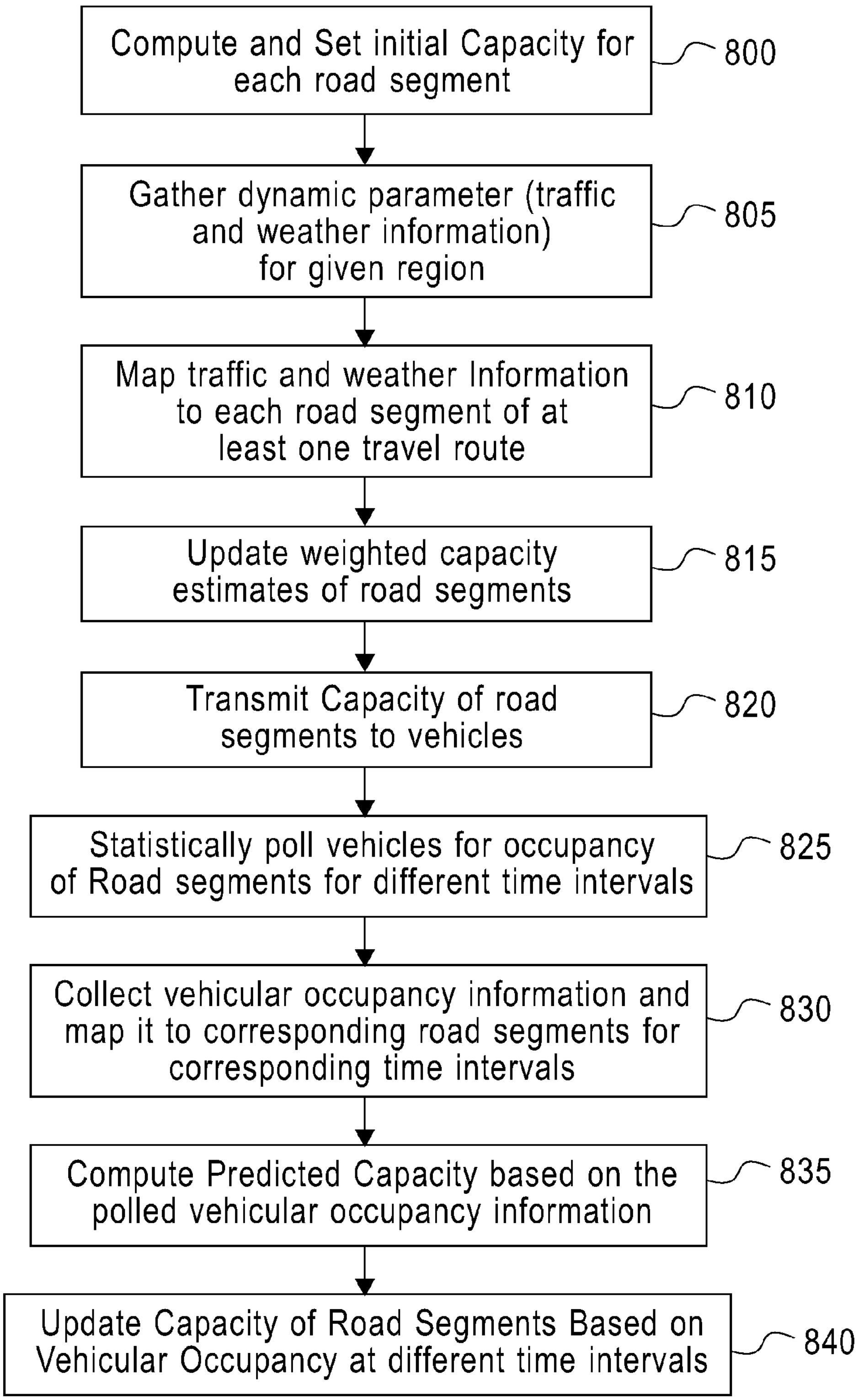
FIG. 13 illustrates an exemplary flowchart for a server according to an embodiment of the present invention.

FIG. 13 illustrates an exemplary flowchart for a server according to an embodiment of the invention.

A server initially computes and sets up the initial capacity of each road segment 800. A server gathers at least one dynamic parameter (e.g., traffic and weather information) for a given region 805. The initial capacity estimates are calculated. The server maps the traffic and weather information onto each road segment of at least one travel route in the given region 810. The server continues to update capacity estimates based on the at least one dynamic parameter 815. The server transmits the capacity estimates to GPS-enabled vehicles 815.

The server statistically polls GPS-enabled vehicles for occupancy of road segments during different time intervals 825. The server collects the information and maps it to the road segments for each time interval 830. The server computes predicted road capacity estimates based at least in part on the polled vehicular occupancy information 835. The server updates the capacity of road segments based on the polled vehicular occupancy information 840.

F. System of the Present Invention

Figure 14:
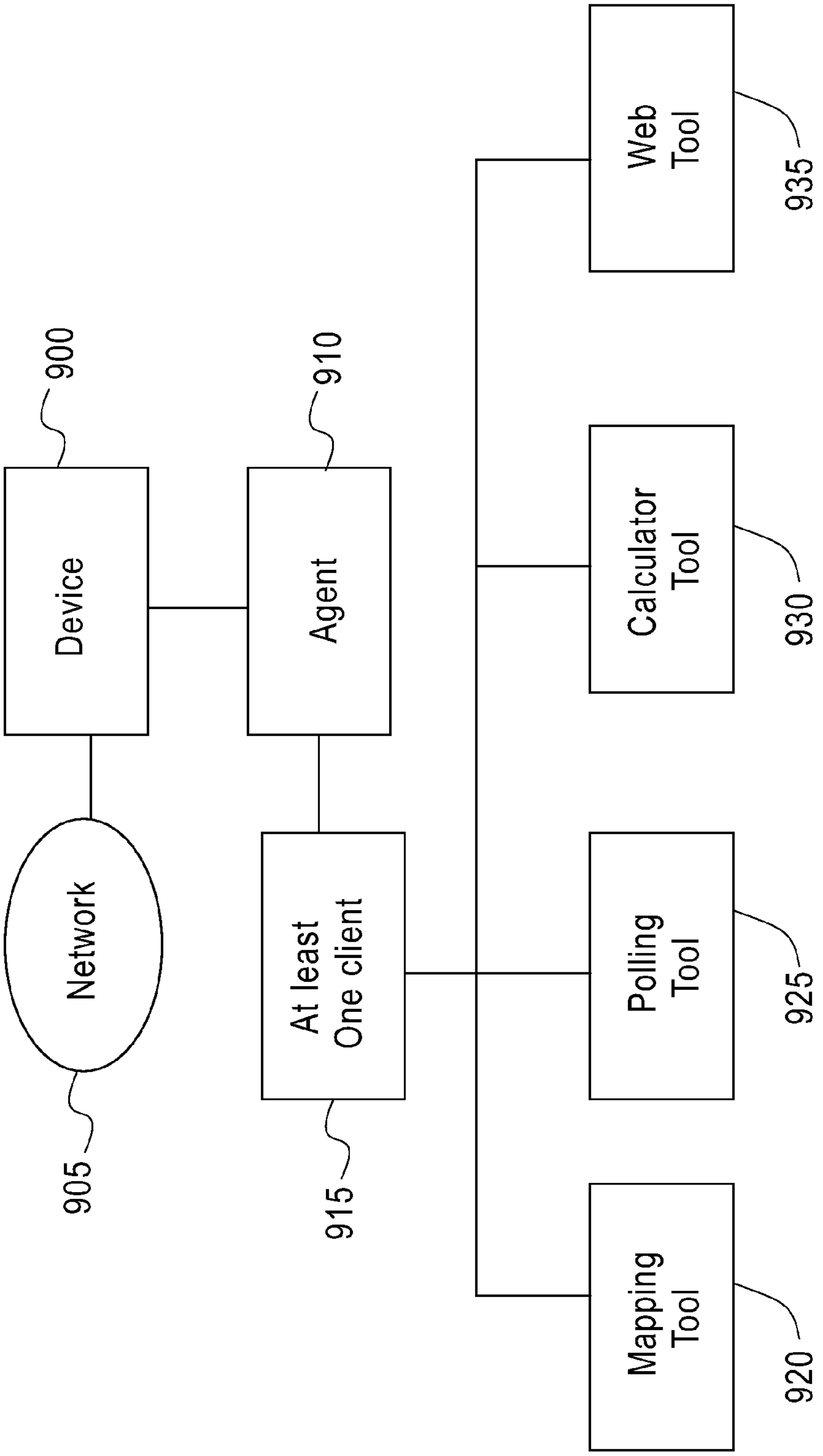
FIG. 14 is a block diagram of a system according to the present invention.

FIG. 14 illustrates is a block diagram of a system according to an embodiment of the present invention. The illustrative system includes at least one electronic or digital device 900 (e.g., on-board navigation device, GPS device, a personal computer, cellular telephone, personal digital assistant or PDA, game device, MP3 player, television). The device may be connected to a network 905 (e.g., the Internet, local area network (LAN), wide area network (WAN)). In embodiments of the invention, the system includes at least one agent 910 for providing predictive traffic information to an on-board navigation system and includes at least one client 915. The illustrative system is but one example, and one of ordinary skill in the art would recognize that many other variations may exist, all of which are contemplated by the invention.

The at least one client 915 comprises at least one of a Mapping Tool 920 for mapping and analyzing at least one travel route, a Polling Tool 925 for statistical polling of a plurality of vehicles equipped with on-board navigation systems; a Calculator Tool 930 for calculating capacity estimates for road segments; and a Web Tool 935 for accessing websites or other data sources to obtain data regarding at least one of a dynamic parameter or catastrophic condition. In embodiments, the agent and its at least one client may be applications residing on at least one of the electronic or digital devices.

Figure 15:
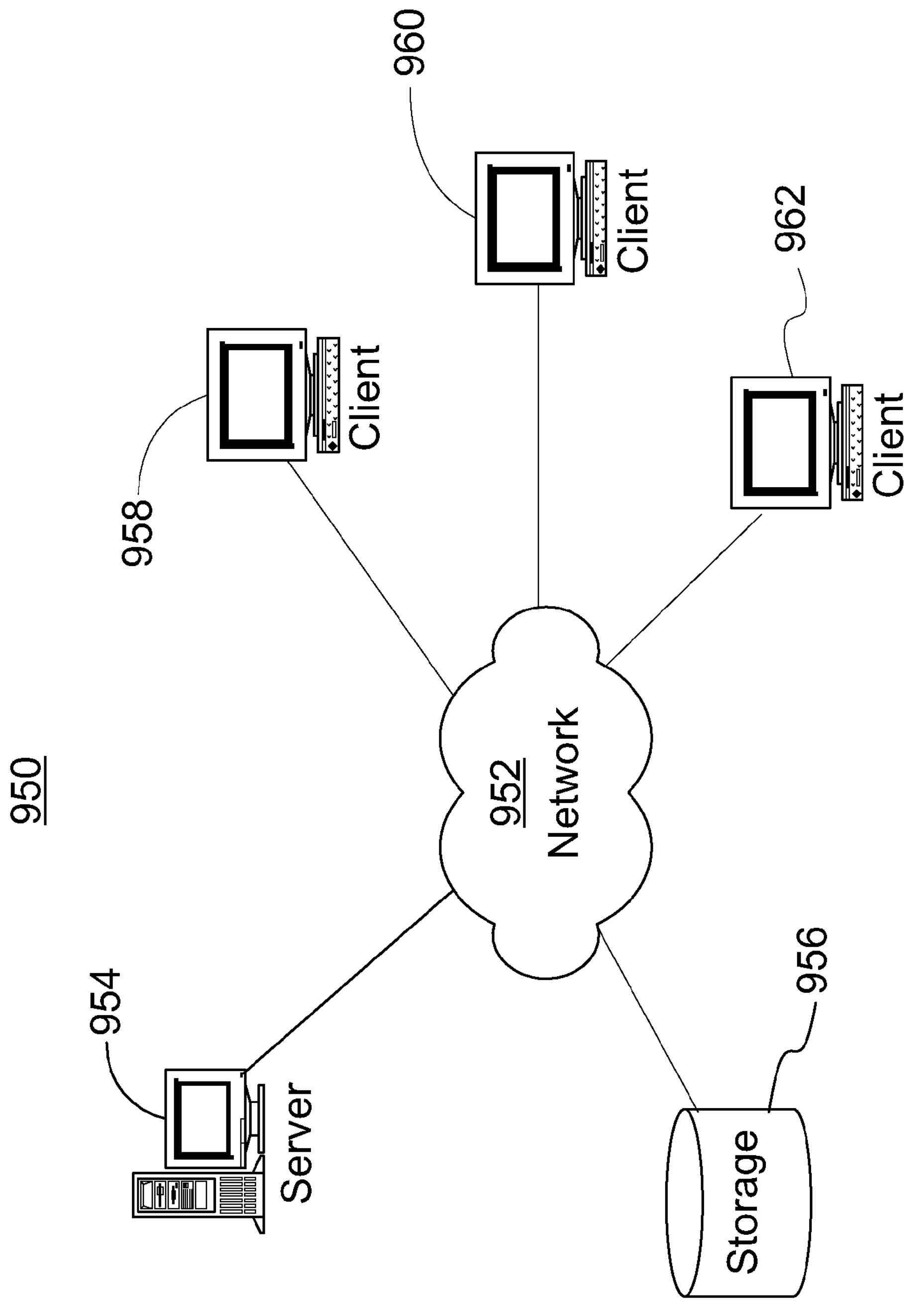
FIG. 15 is a data processing system according to an embodiment of the present invention.

FIG. 15 illustrates an exemplary embodiment of a network data processing system in which the present invention may be implemented. Network data processing system 950 is a network of computers in which the present invention may be implemented. Network data processing system contains a network 952, which is the medium used to provide communications links between various devices and computers connected together within the network data processing system. Network may include connections, such as wire, wireless communication links, or fiber optic cables.

In the illustrated example, a server 954 is connected to network 952 along with storage unit or medium 956. In addition, clients 958, 960, and 962 also are connected to network 952. Network 952 may include permanent connections, such as wire or fiber optic cables, or temporary connections made through telephone connections. The communications network also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 954 without departing from the scope of the present invention.

Clients 958, 960, and 962 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the illustrated example, server 954 provides data to clients 958-962. Clients 958, 960, and 962 are clients to server 954. Network data processing system may include additional servers, clients, and other devices not shown. In the depicted example, network data processing system might be the Internet with network representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system also may be implemented as a number of different types of networks, such as for example, an intranet, a local area network (LAN), or a wide area network (WAN). FIG. 15 is intended as an example, and not as an architectural limitation for the present invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The exemplary and alternative embodiments described above may be combined in a variety of ways with each other. Furthermore, the steps and number of the various steps illustrated in the figures may be adjusted from that shown.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

The invention claimed is:

1. A method for providing predictive traffic information to global positioning satellite systems on board vehicles, comprising:

a plurality of GPS-enabled vehicles, each estimating at least one travel route comprising a plurality of road segments and estimating arrival and exit times for the vehicle in each road segment;

calculating an initial road capacity for each road segment based on the at least one travel route, the estimated arrival and exit times for each road segment, and at least one static parameter;

updating the initial road capacity estimates for each road segment based on at least one of at least one dynamic parameter or at least one catastrophic condition relating to the at least one travel route;

statistically polling a plurality of GPS-enabled vehicles, wherein said statistically polling comprises data including a number of vehicles on at least one travel route in a given geographic region and the time estimates for when each vehicle will arrive and exit each road segment of the at least one travel route; and calculating predictive capacity estimates for each road segment for at least one future time interval based on said statistically polling and the updated road capacity estimates.

2. A method according to claim 1, further comprising:

sending the predictive capacity estimates to the plurality of GPS-enabled vehicles; and said GPS-enabled vehicles re-calculating the at least one travel route and the arrival and exit times for the vehicle in each road segment.

3. A method according to claim 1, comprising calculating predictive capacity estimates for each road segment for at least one future time interval based on said statistical polling and at least one of at least one static parameter, at least one dynamic parameter, or at least one catastrophic condition.

4. A method according to claim 1, wherein the static parameter comprises at least one of the configuration of the at least one travel route, posted speed limits, number of turns, number of traffic lights, turns in the route, number of traffic signs, or type of traffic signs.

5. A method according to claim 1, wherein the dynamic parameter comprises at least one of weather conditions, traffic flow conditions, road conditions, congestion, construction, or detours.

6. A method according to claim 1, wherein the catastrophic condition comprises a road closure, accident, flooding, sink hole, snow closure, or a fire.

7. A method according to claim 1, wherein said at least one dynamic condition or at least one catastrophic conditions is obtained by accessing at least one of websites; weather sources; or state, local, or federal agencies.

8. A method according to claim 1, wherein the at least one travel route is segmented into a plurality of segments based on length between at least one of intersections, traffic lights, traffic signs, or landmarks.

9. A method according to claim 1, wherein the initial capacity estimates are weighted for each road segment.

10. A method according to claim 1, wherein said statistically polling comprises polling different types of vehicles.

11. A method according to claim 10, wherein said statistically polling further comprises polling the year of manufacture for the vehicles.

12. A method according to claim 1, wherein the at least one future time interval comprises 15 minutes in the future.

13. A method according to claim 1, wherein the at least one future time interval comprises 60 minutes in the future.

14. A method according to claim 1, wherein a driver of a GPS-enabled vehicle is given an option for responding to said statistically polling.

15. A method according to claim 1, wherein a driver has an option of ensuring that said statistical polling is anonymous.

16. A method for providing predictive traffic information to global positioning satellite systems on board vehicles, comprising:

a plurality of GPS-enabled vehicles, each estimating at least one travel route comprising a plurality of road segments and estimating arrival and exit times for each road segment;

calculating an initial road capacity for each road segment based on the estimated arrival and exit times for each road segment and at least one of posted speed limits, traffic signs, or traffic lights;

updating the initial road capacity estimates based on at least one of traffic flow conditions or weather conditions;

statistically polling the plurality of GPS-enabled vehicles, including a number of vehicles on at least one travel route in a geographic region, each vehicle providing the at least one travel route and estimated arrival and exit times for each road segment;

calculating predictive capacity estimates for each road segment for at least one future interval based on said updated road capacity estimates and said statistical polling;

sending the predictive capacity estimates for at least one future time interval to a plurality of GPS-enabled vehicles; and said GPS-enabled vehicles re-calculating the at least one travel route and the arrival and exit times for each road segment.

17. A system for providing predictive traffic information to global positioning satellite systems on board vehicles, comprising:

a processor for calculating predictive capacity estimates for future intervals for each road segment of at least one travel route;

a Polling Tool for statistical polling of a plurality of GPS-enabled vehicles, including a number of vehicles on at least one travel route in a geographic region, each vehicle providing the at least one travel route and estimated arrival and exit times for each road segment;

a Mapping Tool for mapping and analyzing at least one travel route, a Calculator Tool for calculating capacity estimates for road segments; and a Weather Tool for accessing websites or other data sources to obtain data regarding at least one of a dynamic parameter or catastrophic condition.

18. A computer program product, comprising a computer useable medium having a computer readable program, wherein the computer readable program when executed on a computer causes the computer to:

estimate at least one travel route comprising a plurality of road segments and estimate arrival and exit times in each road segment for at least one GPS-enabled vehicle;

calculate an initial road capacity for each road segment based on the at least one travel route, the estimated arrival and exit times for each road segment, and at least one static parameter;

update the initial road capacity estimates for each road segment based on at least one of at least one dynamic parameter or at least one catastrophic condition relating to the at least one travel route;

statistically poll a plurality of GPS-enabled vehicles, wherein said statistically polling comprises data including a number of vehicles on at least one travel route in a given geographic region and the time estimates for when each vehicle will arrive and exit each road segment of the at least one travel route; and calculate predictive capacity estimates for each road segment for at least one future time interval based on said statistically polling and the updated road capacity estimates.

19. A method according to claim 1, wherein the on-board GPS device provides data regarding the at least one static parameter.

20. A method according to claim 1, wherein the on-board GPS device provides data regarding the at least one dynamic or catastrophic condition.

* * * * *